US012676755B2

(12) United States Patent
Wang

(10) Patent No.: US 12,676,755 B2
(45) Date of Patent: Jul. 7, 2026

(54) BLOCKCHAIN-BASED DATA DETECTION METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventor: Jian Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 178 days.

(21) Appl. No.: 18/369,723

(22) Filed: Sep. 18, 2023

(65) Prior Publication Data

US 2024/0015028 A1 Jan. 11, 2024

Related U.S. Application Data

(63) Continuation of application No. PCT/CN2023/101634, filed on Jun. 21, 2023.

(30) Foreign Application Priority Data

Jul. 8, 2022 (CN) .......................... 202210799019.1

(51) Int. Cl.
*H04L 9/32* (2006.01)
*H04L 9/00* (2022.01)
(52) U.S. Cl.
CPC ............ *H04L 9/3247* (2013.01); *H04L 9/321* (2013.01); *H04L 9/50* (2022.05)
(58) Field of Classification Search
None
See application file for complete search history.

(56) References Cited

U.S. PATENT DOCUMENTS 10,601,590 B1 * 3/2020 Chhabra ................. G06F 21/44
2017/0373854 A1 * 12/2017 Frascadore ......... H04L 41/0896
(Continued)

FOREIGN PATENT DOCUMENTS

CN 111090888 A 5/2020
CN 111460458 A 7/2020
(Continued)

OTHER PUBLICATIONS

Gupta, A., Gupta, R., Jadav, D., Tanwar, S., Kumar, N. and Shabaz, M., 2023. Proxy smart contracts for zero trust architecture implementation in Decentralised Oracle Networks based applications. Computer Communications, 206, pp. 10-21. (Year: 2023).*
(Continued)

*Primary Examiner* — Luu T Pham
*Assistant Examiner* — Edward X Long
(74) *Attorney, Agent, or Firm* — Morgan, Lewis & Bockius LLP

(57) ABSTRACT

This application discloses a blockchain-based data detection method performed by a computer device. The method includes: calling an oracle smart contract based on a verification smart contract to initiate a verification request for a trusted execution environment platform, where the verification request includes an environment signature corresponding to the trusted execution environment platform; triggering an environment verification event comprising the environment signature based on the verification request, wherein an oracle node is configured to obtain verification information about the trusted execution environment platform from a verification service node in response to the environment verification event; and obtaining the verification information from the oracle node and returning the verification information to the verification smart contract.

17 Claims, 5 Drawing Sheets

(56)         References Cited

U.S. PATENT DOCUMENTS

2021/0097528 A1* 4/2021 Wang ..................... H04L 9/30
2021/0328791 A1* 10/2021 Wei ......................... G06F 21/57
2022/0158856 A1   5/2022 Maximov et al.
2023/0385822 A1* 11/2023 Shanmugam ........ G06Q 20/381

FOREIGN PATENT DOCUMENTS

CN          114338054 A    4/2022
WO      WO 2020125942 A1    6/2020

OTHER PUBLICATIONS

Jyoti, A. and Chauhan, R.K., 2022. A blockchain and smart contract-based data provenance collection and storing in cloud environment. Wireless Networks, 28(4), pp. 1541-1562. (Year: 2022).*
Tencent Technology, ISR, PCT/CN2023/101634, Sep. 14 2023, 2 pgs.

* cited by examiner

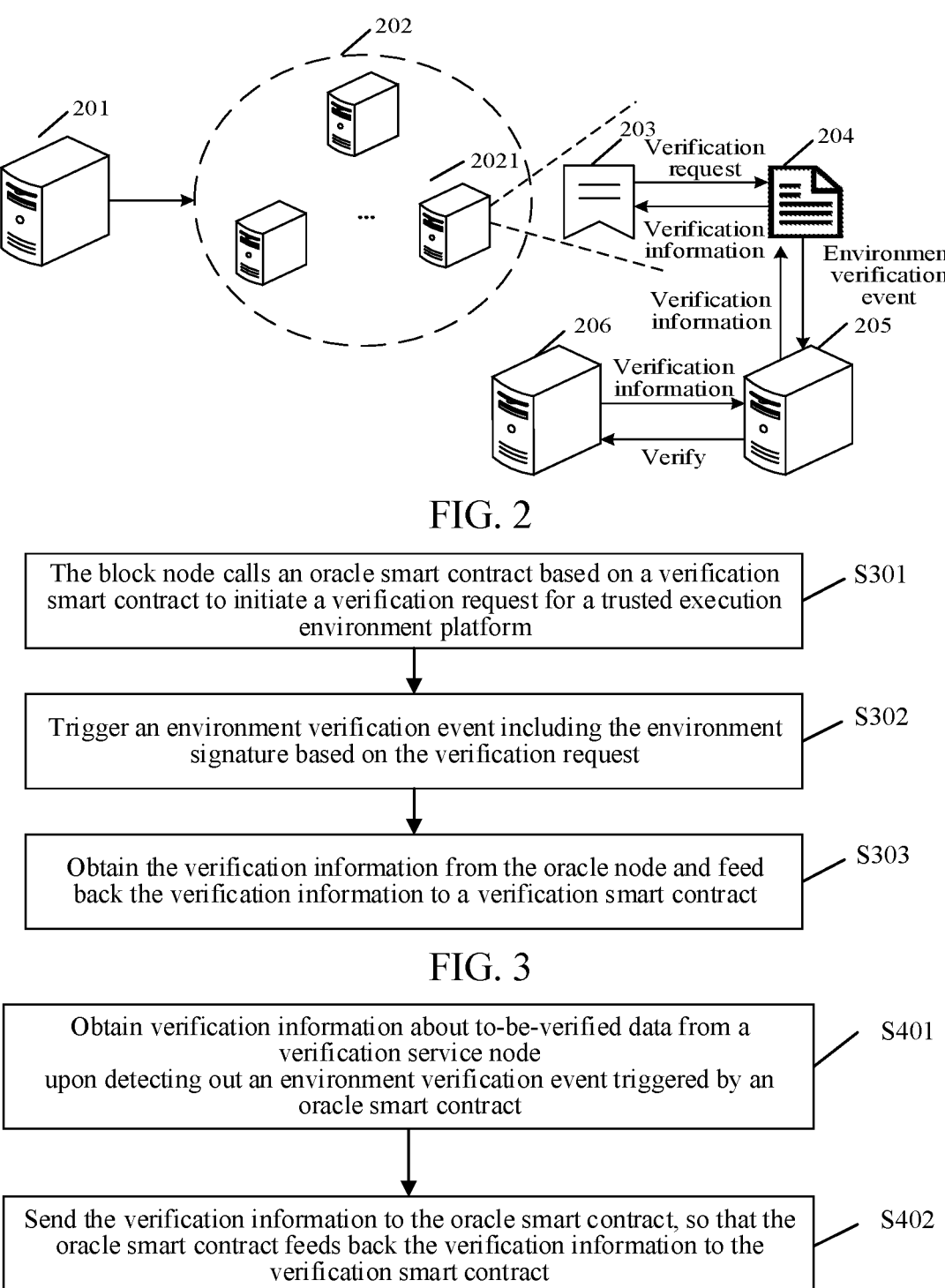

FIG. 2

| The block node calls an oracle smart contract based on a verification smart contract to initiate a verification request for a trusted execution environment platform | S301 |

| Trigger an environment verification event including the environment signature based on the verification request | S302 |

| Obtain the verification information from the oracle node and feed back the verification information to a verification smart contract | S303 |

FIG. 3

| Obtain verification information about to-be-verified data from a verification service node upon detecting out an environment verification event triggered by an oracle smart contract | S401 |

| Send the verification information to the oracle smart contract, so that the oracle smart contract feeds back the verification information to the verification smart contract | S402 |

FIG. 4

BLOCKCHAIN-BASED DATA DETECTION METHOD AND APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2023/101634, entitled "BLOCKCHAIN-BASED DATA DETECTION METHOD AND APPARATUS, DEVICE, STORAGE MEDIUM, AND PROGRAM PRODUCT" filed on Jun. 21, 2023, which claims priority to Chinese Patent Application No. 202210799019.1 entitled "BLOCKCHAIN-BASED DATA DETECTION METHOD AND APPARATUS, DEVICE, STORAGE MEDIUM, AND PROGRAM PRODUCT" filed on Jul. 8, 2022, all of which is incorporated by reference in its entirety.

FIELD OF THE TECHNOLOGY

This application relates to the field of blockchain technologies, and in particular, to a blockchain-based data detection method and apparatus, a device, a storage medium, and a program product.

BACKGROUND OF THE DISCLOSURE

Data privacy computing technologies based on a trusted execution environment (TEE) aim at solving data privacy leakage that may be caused when a data provider (DA) provides data to a data user (DU) and the DU resells the received data.

In related technologies, DA needs to directly send data in plaintext to DU for analysis and use in a local environment. However, many sensitive data cannot be provided in plaintext by DA. Therefore, TEE is introduced, so that DA and DU can encrypt and transmit data to a TEE platform, and decrypt and analyze the data in the TEE platform. DA returns computing results to DU, so that DU cannot obtain original plaintext data, which guarantees security of the data. However, reliability and credibility of the TEE platform cannot be known in the related technologies, and the security of the data cannot be guaranteed accordingly.

SUMMARY

Embodiments of this application provide a blockchain-based data detection method and apparatus, a computer device, a computer-readable storage medium, and a computer program product, which can improve efficiency of blockchain-based data detection and enhance security of a trusted execution environment platform.

An embodiment of this application provides a blockchain-based data detection method performed by a computer device, the method including:

calling an oracle smart contract based on a verification smart contract to initiate a verification request for a trusted execution environment platform, where the verification request includes an environment signature corresponding to the trusted execution environment platform;

triggering an environment verification event comprising the environment signature based on the verification request, wherein an oracle node is configured to obtain verification information about the trusted execution environment platform from a verification service node in response to the environment verification event; and obtaining the verification information from the oracle node and returning the verification information to the verification smart contract.

An embodiment of this application further provides a blockchain-based data detection method performed by a computer device, the method including:

obtaining an environment signature corresponding to a trusted execution environment platform included in an environment verification event from a verification service node upon detecting the environment verification event triggered by an oracle smart contract, where the environment signature is included in a verification request for the trusted execution environment platform, and the oracle smart contract is called by a verification smart contract; and returning the verification information to the verification smart contract through the oracle smart contract.

An embodiment of this application further provides a computer device, including a processor, a memory, and an input/output interface, where the processor is connected to the memory and the input/output interface respectively, the input/output interface is configured to receive and output data, the memory is configured to store a computer program, the processor is configured to call the computer program, and the computer device including the processor is enabled to perform the blockchain-based data detection method provided by the embodiments of this application.

An embodiment of this application further provides a non-transitory computer-readable storage medium, the computer-readable storage medium storing a computer program, the computer program being suitable for being loaded and executed by a processor of a computer device, and the computer device being enabled to perform the blockchain-based data detection method provided by the embodiments of this application.

By implementing the embodiments of this application, the following beneficial effects will be achieved.

In the embodiments of this application, a block node may call an oracle smart contract to initiate a verification request for a trusted execution environment platform, where the verification request includes an environment signature corresponding to the trusted execution environment platform; trigger an environment verification event including the environment signature based on the verification request, so that the oracle node obtains, upon detecting out the environment verification event, verification information about to-be-verified data included in the environment verification event from a verification service node, where the to-be-verified data includes the environment signature; and obtaining the verification information from the oracle node and returning the verification information to the verification smart contract.

The trusted execution environment platform is verified through the above process to ensure the security, reliability, and credibility of the trusted execution environment platform, so that data security can be ensured when the trusted execution environment platform is used subsequently. Moreover, the trusted execution environment platform is remotely verified through the smart contracts based on the characteristics of openness, transparency, and tamper resistance of the blockchain, so that the verification process is traceable, the credibility of verification on the trusted execution environment platform is improved, and the accuracy of verification on the trusted execution environment platform is improved accordingly. Meanwhile, communication between a blockchain network and the verification service node to which the verification smart contract belongs is directly opened through the oracle smart contract and the oracle node to implement real-time verification, thereby improving the efficiency of verifying the trusted execution environment platform and reducing operation and maintenance costs.

BRIEF DESCRIPTION OF THE DRAWINGS

FIG. 2 is a schematic diagram of a blockchain-based data detection scenario according to an embodiment of this application.

FIG. 3 is a flowchart of a blockchain-based data detection method according to an embodiment of this application.

FIG. 4 is a flowchart of another blockchain-based data detection method according to an embodiment of this application.

DESCRIPTION OF EMBODIMENTS

Figure 1A:
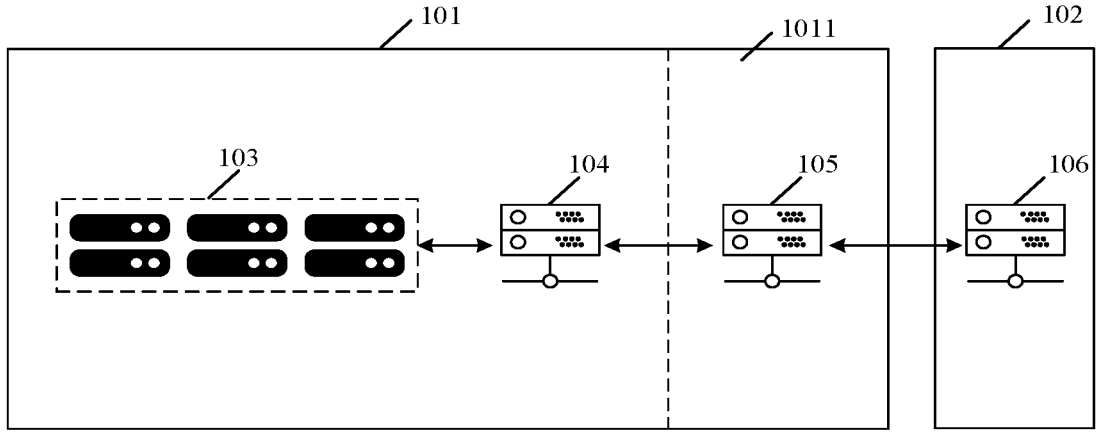
FIG. 1A is a diagram of a network interaction architecture for blockchain-based data detection according to an embodiment of this application.

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without making creative efforts shall fall within the protection scope of this application.

The embodiments of this application can store and transmit data in a blockchain mentioned in this application (such as data related to a verification smart contract and an oracle smart contract), data related to a trusted execution environment platform, data associated with a verification service node and an oracle node, and the like based on a cloud technology, and can be applicable to the field of data transmission in big data.

The cloud technology refers to a hosting technology that unifies series resources such as hardware, software, and a network within a wide area network or a local area network to implement computation, storage, processing, and sharing of data.

Some terms involved in the embodiments of this application are introduced.

1. Blockchain: In a narrow sense, a blockchain is a chain data structure based on blocks, where previous transaction histories are verified with digital digests in blocks, so the blockchain is suitable for tamper-proofing and scalability requirements in distributed accounting scenarios. In a broad sense, the blockchain further refers to distributed accounting technologies implemented by a blockchain structure, including distributed consensus, privacy and security protection, peer-to-peer communication technology, network protocols, smart contracts, and the like. A goal of the blockchain is to implement a distributed data record ledger, which allows only addition but rejects deletion. A basic underlying structure of the ledger is a linear linked list. The linked list includes concatenated "blocks", where subsequent blocks record hash values of previous blocks. Whether each block (and transactions in the block) is valid can be quickly verified by computing hash values. If a node in a network proposes to add a new block, the block has to be verified by a consensus mechanism. The blockchain is a novel application mode of computer technologies such as distributed data storage, peer-to-peer transmission, consensus mechanisms, and encryption algorithms, to concatenate and protect serial transaction records of content (also known as blocks) by means of cryptography. Distributed ledgers connected by the blockchain can enable multiple parties to effectively record transactions and permanently verify the transactions (without tampering).

2. Block: A block records all transactions, status results, and the like within a period of time, and is a consensus on a current status of a ledger. For example, for a blockchain, every time data are written, that is, the foregoing transaction process, to create a block.

3. Chain: A chain is formed by concatenating blocks in an order of occurrence, and is a log record of changes in the status of the entire ledger.

4. Smart contract: A computer protocol for propagating, verifying, or executing a contract in an information-based manner. The smart contract allows trusted transactions in the absence of a third party, and the transactions are traceable and irreversible. The smart contract in this invention patent specifically refers to executable code deployed on the blockchain.

5. Oracle: An oracle refers to a mechanism or service that writes external information into a blockchain to implement data exchange between the blockchain and the real world, and is a way for data interaction between a smart contract and the outside.

6. Data provider (DA): An organization that has mass data and can be authorized for use by a third party. Data user (DU): An organizational structure that has data usage requirements and obtains authorization from DA to use data.

7. Trusted execution environment (TEE): Build a security region in a central processing unit by software and hardware methods to protect confidentiality and integrity of programs and data loaded inside.

In the embodiments of this application, refer to FIG. 1A. FIG. 1A is a diagram of a network interaction architecture for blockchain-based data detection according to an embodiment of this application. As shown in FIG. 1A, a local area network 101 and an internet 102 may be included. The local area network 101 may be considered as an internal network, is equivalent to a regional network formed locally, refers to a computer group of interconnected computer devices in a region, and can implement functions such as file management, application software sharing, and printer sharing. The internet 102 may be considered as an external network, and is equivalent to a huge network of concatenated networks. A trusted execution environment (TEE) platform 103 and a blockchain network 104 are deployed in the local area network 101, and the blockchain network 104 may include at least one block node. In some embodiments, the local area network 101 may further include a demilitarized zone (DMZ) 1011, or a demilitarized zone 1011 may be deployed between the local area network 101 and the internet 102, the demilitarized zone 1011 includes an oracle node 105, and the oracle node 105 is configured to provide oracle services. In practical applications, the internet 102 includes a verification service node.

The demilitarized zone 1011 is a buffer zone established between a non-secure system and a secure system to solve a problem that an access object (such as a user) of an external network cannot access an internal network server after a firewall is installed. The buffer zone is located in a small network area between the internal network and the external network. Some server facilities that have to be publicly available, such as enterprise web servers, file transfer protocol servers (FTP servers), and forums, can be placed in the small network area. A web server generally refers to a website server, which refers to a program residing on a type of computer on the internet and is capable of processing requests from web clients such as browsers and returning corresponding responses. On the other hand, such a DMZ can protect the internal network more effectively. Compared to general firewall solutions, the demilitarized zone as a network deployment is an additional barrier for attackers from the external network, that is, a guard for the internal network.

Figure 1B:
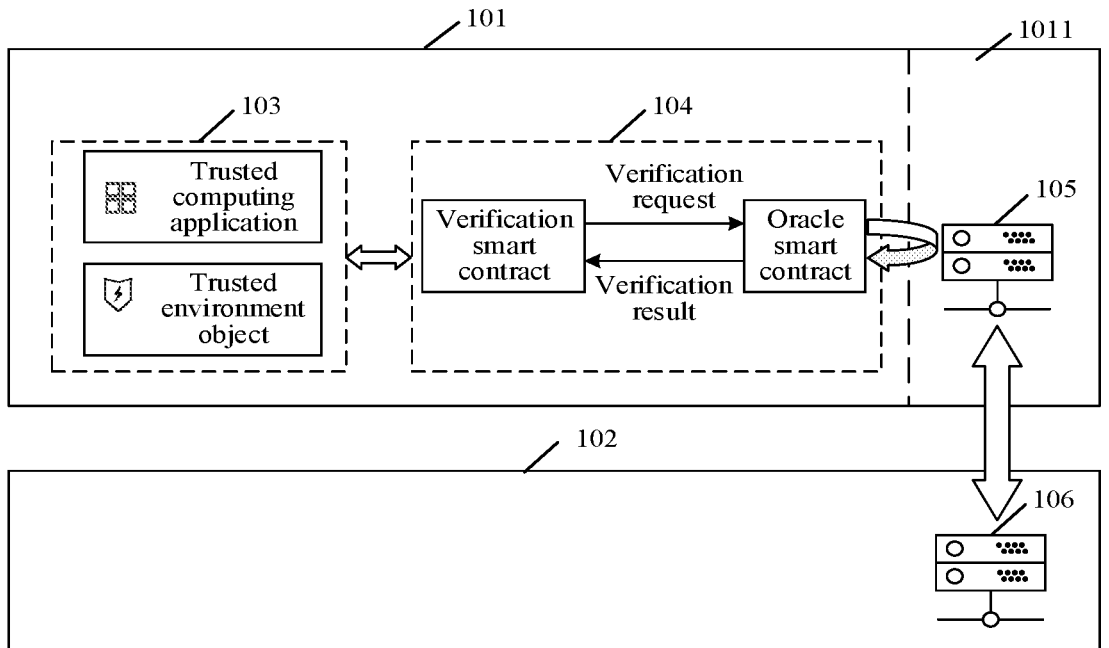
FIG. 1B is a diagram of a data detection architecture according to an embodiment of this application.

Refer to FIG. 1B. FIG. 1B is a diagram of a data detection architecture according to an embodiment of this application. FIG. 1B is a supplementary explanation of FIG. 1A. As shown in FIG. 1B, the trusted execution environment platform 103 may include a trusted computing application, a trusted environment object, and the like. The trusted computing application may be considered as a software guard extensions (SGX) application and a type of software. The trusted environment object may be considered as an SGX device, which may be but not limited to a physical server, virtual machine, or the like. The trusted execution environment platform 103 may include N trusted environment objects, N being a positive integer. In practical applications, the N trusted environment objects may be considered as an SGX device cluster. The blockchain network 104 may include a verification smart contract and an oracle smart contract. The verification smart contract may be used for data interaction with the trusted execution environment platform and may obtain data from the internet 102 by calling the oracle smart contract. The oracle smart contract is used for calling an oracle node, providing oracle services by combining with the oracle node, writing information outside a blockchain into the blockchain, and implementing data interaction between an oracle node 105 and a verification service node 106. For example, a block node may call the oracle smart contract in the verification smart contract to initiate a verification request for the trusted execution environment platform, obtain a verification result for the verification request from the oracle node 105 based on the oracle smart contract, and feed back the verification result to the verification smart contract based on the oracle smart contract.

Refer to FIG. 2. FIG. 2 is a schematic diagram of a blockchain-based data detection scenario according to an embodiment of this application. As shown in FIG. 2, a trusted execution environment platform 201 may send an environment signature to a blockchain network 202, and any block node in the blockchain network 202 receives the environment signature and may verify the trusted execution environment platform 201. It is assumed that a block node 2021 receives the environment signature. The block node 2021 may call an oracle smart contract 204 based on a verification smart contract 203 to initiate a verification request for the trusted execution environment platform 201.

By calling the oracle smart contract 204, an environment verification event including the environment signature is triggered based on the verification request. Upon detecting out the environment verification event, an oracle node 205 may obtain, from a verification service node 206, verification information about to-be-verified data included in the environment verification event, the to-be-verified data including the environment signature. The oracle node 205 may call the oracle smart contract 204 to return the verification information to the blockchain network 202, namely, feed back the verification information to the oracle smart contract 204, and the block node 2021 calls the verification smart contract 203 through the oracle smart contract 204 to feed back the verification information to the verification smart contract 203, so that the trusted execution environment platform 201 or other service device can obtain the verification information from the blockchain network 202. Through the oracle smart contract and the oracle node, data outside the blockchain network can be written into the blockchain network to achieve data exchange between the blockchain network and the real world, thereby implementing data exchange between a local area network and the internet based on the oracle smart contract and the oracle node, guaranteeing security of the data exchange between the local area network and the internet based on the characteristics of openness, transparency, tamper resistance, and the like of the blockchain network, and further improving security and reliability of verification on the trusted execution environment platform.

It may be understood that the block node, the oracle node, or the verification service node mentioned in the embodiments of this application may all be a computer device, and the computer device in the embodiments of this application includes but is not limited to a terminal device or a server. That is, the computer device may be a server or a terminal device, or may be a system including a server and a terminal device. The terminal device mentioned above may be an electronic device, including but not limited to a mobile phone, a tablet computer, a desktop computer, a laptop computer, a palm computer, a vehicle device, an augmented reality/virtual reality (AR/VR) device, a helmet-mounted display, a wearable device, a smart speaker, a digital camera, a camera, other mobile internet devices (MIDs) with network access capabilities, and the like. The server mentioned above may be an independent physical server, or a server cluster or distributed system including a plurality of physical servers, or a cloud server providing basic cloud computing services such as cloud services, cloud databases, cloud computation, cloud functions, cloud storage, network services, cloud communications, middleware services, domain name services, security services, vehicle-road coordination, content delivery networks (CDN), big data, and artificial intelligence platforms.

FIG. 3 is a flowchart of a blockchain-based data detection method according to an embodiment of this application. As shown in FIG. 3, a block node serves as an executive subject, the block node may be a computer device, and the blockchain-based data detection method includes the following steps:

Step S301. The block node calls an oracle smart contract based on a verification smart contract to initiate a verification request for a trusted execution environment platform.

In this embodiment of this application, the block node may call the oracle smart contract based on the verification smart contract to initiate the verification request for the trusted execution environment platform, where the verification request is used for verifying credibility of the trusted execution environment platform, namely, verifying whether the trusted execution environment platform is credible. The block node may be any node in a blockchain network, and the block node may run the verification smart contract, the oracle smart contract, and the like. In practical applications, the block node may receive a usage request sent by a service device for the trusted execution environment platform, where the usage request is used for requesting for usage of the trusted execution environment platform; run the verification smart contract based on the usage request, trigger the oracle smart contract based on the verification smart contract, and generate the verification request for the trusted execution environment platform, where the verification request is used for requesting a verification service node to verify the credibility of the trusted execution environment platform based on an environment signature of the trusted execution environment platform, and the verification smart contract sends the verification request to the oracle smart contract to initiate the verification request for the trusted execution environment platform; or the trusted execution environment platform may send to-be-verified data to the blockchain network, and the block node in the blockchain network may run the verification smart contract based on the to-be-verified data and trigger the oracle smart contract based on the verification smart contract to initiate the verification request for the trusted execution environment platform. That is, a verification process for the trusted execution environment platform may be triggered by the trusted execution environment platform, or may be triggered by a service device using the trusted execution environment platform. The service device may be a data provider, a data user, or the like, which is not limited here. The verification request includes an environment signature corresponding to the trusted execution environment platform. In practical applications, the environment signature may be a digital signature performed on platform information (such as an identifier or serial number of the trusted execution environment platform) by the trusted execution environment platform using a private key. The to-be-verified data mentioned above may include the environment signature.

For example, the service device may send the usage request for the trusted execution environment platform to the block node when using the trusted execution environment platform, and the block node may directly run the verification smart contract based on the usage request, obtain the environment signature of the trusted execution environment platform from the trusted execution environment platform based on the verification smart contract, and call the oracle smart contract based on the verification smart contract to initiate the verification request for the trusted execution environment platform, where the to-be-verified data of the trusted execution environment platform may be obtained, and the to-be-verified data includes the environment signature. Alternatively, in practical applications, the block node receives the usage request sent by the service device for the trusted execution environment platform, where the usage request may include an object credential of a trusted environment object in the trusted execution environment platform. In some embodiments, the usage request may further include a platform identifier of the trusted execution environment platform. The object credential may be considered as a credential of the trusted environment object triggered for usage when the service device uses the trusted execution environment platform, and the credential may be used for proving that the service device has permission to use the trusted environment object. The block node may verify the object credential. If the object credential passes the verification, the block node calls the oracle smart contract based on the verification smart contract to initiate the verification request for the trusted execution environment platform. If the object credential fails in the verification, the block node sends a usage failure message to the service device. In practical applications, the usage failure message can further include failure reasons and the like.

Alternatively, the block node may receive the to-be-verified data sent by the trusted execution environment platform, where the to-be-verified data includes the environment signature corresponding to the trusted execution environment platform. The block node runs the verification smart contract based on the to-be-verified data, and triggers the oracle smart contract based on the verification smart contract to initiate the verification request for the trusted execution environment platform.

The verification request includes the environment signature (namely, digital signature) of the trusted execution environment platform. In practical applications, the block node may obtain the to-be-verified data of the trusted execution environment platform from the trusted execution environment platform based on the verification smart contract, where the to-be-verified data includes the environment signature. The to-be-verified data may further include source data. The trusted execution environment platform may obtain a platform private key and sign the source data with the platform private key to obtain the environment signature for the source data. In practical applications, the source data may be executable code in the trusted execution environment platform, exclusive execution code for verification, other random data, or the like, which is not limited here. The trusted execution environment platform may include N (N is a positive integer) trusted environment objects, the trusted environment object may be considered as an SGX device, the trusted environment object may include an SGX chip, and the platform private key of the trusted environment object may be considered as burned into the SGX chip included in the trusted environment object, or may be dynamically allocated by the verification service node. For example, the verification service node may generate a pair of platform public and private keys for each trusted environment object, namely, a platform public key and a platform private key, and burn (store) the platform private key into the SGX chip included in the trusted environment object. Meanwhile, the verification service node may provide public key certificate authentication for the trusted execution environment platform, where the public key certificate authentication is used for associating each trusted environment object with the platform public key of the trusted environment object, so that any service device or the like can determine information of the platform public key. Alternatively, the verification service node may periodically allocate a pair of platform public and private keys to the N trusted environment objects, so that the platform public key and platform private key of the trusted environment object are dynamically changing, which can improve the security of the trusted execution environment platform to some extent. The verification service node refers to an authority node with public credibility, such as an Intel attention server node that remotely verifies the trusted execution environment platform in this application. The verification service node manages the platform public key associated with the trusted execution environment platform, which can improve the security of the trusted execution environment platform. In practical applications, the to-be-verified data may further include other auxiliary information for remote verification on the trusted execution environment platform. The auxiliary information is specifically determined by the verification service node, that is, verification parameters required by the verification service node to remotely verify the trusted execution environment platform may be obtained, and the auxiliary information may be obtained based on the verification parameters.

In practical applications, a communication channel between the block node and the trusted execution environment platform may be constructed. Through the communication channel, the to-be-verified data are obtained from the trusted execution environment platform. The communication channel may be considered as an encrypted communication channel. The block node may create the communication channel to the trusted execution environment platform in following manners. The block node may create the communication channel to the trusted execution environment platform by a channel encryption algorithm. Alternatively, a symmetric encryption key may be exchanged between the block node and the trusted execution environment platform, and the communication channel may be created between the block node and the trusted execution environment platform based on the symmetric encryption key. Alternatively, a first public parameter and a second public parameter may be obtained, a block private parameter may be obtained, and a block public key may be generated according to the first public parameter, the second public parameter, and the block private parameter. An environment public key corresponding to the trusted execution environment platform is obtained, and the communication channel to the trusted execution environment platform is constructed based on the block public key and the environment public key.

The environment public key is generated by the trusted execution environment platform according to the first public parameter, the second public parameter, and an environment private parameter. Through the communication channel, the environment signature corresponding to the trusted execution environment platform is obtained, for example, the to-be-verified data corresponding to the trusted execution environment platform is obtained, the to-be-verified data including the environment signature. In practical applications, the trusted execution environment platform may obtain a first public parameter p and a second public parameter g, where the first public parameter may be considered as a prime number, the second public parameter may be considered as a primitive root, and the trusted execution environment platform may obtain a random number a as the environment private parameter of the trusted execution environment platform. The trusted execution environment platform may generate an environment public key Akey according to the first public parameter p, the second public parameter g, and the environment private parameter a, and send the environment public key to the blockchain network. Any block node may obtain the first public parameter p and the second public parameter g, obtain a random number b as the block private parameter of the blockchain network, generate a block public key Bkey according to the first public parameter p, the second public parameter g, and the block private parameter b, and send the block public key to the trusted execution environment platform. The communication channel to the trusted execution environment platform is constructed based on the block public key and the environment public key. For example, the block node may generate a shared key based on the environment public key, the block private parameter, and the first public parameter; and the trusted execution environment platform may generate the shared key based on the block public key, the environment private parameter, and the first public parameter. In this way, the shared keys generated by the block node and the trusted execution environment platform are the same; and when the shared keys are generated, the block node has the non-public block private parameter, while the trusted execution environment platform has the non-public environment private parameter, so that encrypted transmission of data can be achieved between the blockchain network and the trusted execution environment platform to improve the security of data transmission.

For example, in practical applications, a process of generating the environment public key $A_{key}$ according to the first public parameter p, the second public parameter g, and the environment private parameter a may be seen in formula (1):

$$A_{key} = g^a \bmod p \tag{1}$$

A process of generating the block public key $B_{key}$ according to the first public parameter p, the second public parameter g, and the block private parameter b may be seen in formula (2):

$$B_{key} = g^b \bmod p \tag{2}$$

A process of generating the shared key according to the block public key, the environment private parameter, and the first public parameter may be seen in formula (3):

$$\text{Key} = B_{key}{}^a \bmod p = (g^b)^a (\bmod p) \tag{3}$$

A process of generating the shared key according to the environment public key, the block private parameter, and the first public parameter may be seen in formula (4):

$$\text{Key} = A_{key}{}^b \bmod p = (g^a)^b (\bmod p) \tag{4}$$

The above formulas (1) to (4) show a shared key generation method. Through the method, a trusted communication channel is constructed between the blockchain network and the trusted execution environment platform. The shared key may alternatively be generated by other methods. For example, the shared key may be generated by an asymmetric encryption algorithm. The methods are not limited here.

In practical applications, the environment signature corresponding to the trusted execution environment platform may be obtained through the communication channel. For example, the trusted execution environment platform may encrypt the to-be-verified data including the environment signature corresponding to the trusted execution environment platform to obtain to-be-transmitted data, and send the to-be-transmitted data to the blockchain network; and the block node in the blockchain network receives the to-be-transmitted data and may decrypt the to-be-transmitted data to obtain the environment signature included in the to-be-verified data. For example, the trusted execution environment platform may encrypt the to-be-verified data with a symmetric encryption key to obtain the to-be-transmitted data, and send the to-be-transmitted to the blockchain network; and the block node in the blockchain network may decrypt the to-be-transmitted data with a symmetric encryption key to obtain the to-be-verified data. Alternatively, the trusted execution environment platform may encrypt the to-be-verified data with the shared key to obtain the to-be-transmitted data, and send the to-be-transmitted data to the blockchain network. The block node in the blockchain network receives the to-be-transmitted data, may decrypt the to-be-transmitted data with the shared key to obtain the environment signature included in the to-be-verified data, and then may verify the credibility of the trusted execution environment platform based on the environment signature.

In practical applications, the trusted execution environment platform may sign the to-be-verified data including the environment signature or the environment signature to obtain signature information about the environment signature, and send the signature information to the blockchain network. The block node in the blockchain network may verify the signature information. If the verification succeeds, it is determined that the environment signature is normal, and the to-be-verified data or the environment signature may be obtained. In some embodiments, the signature information may be verified based on the platform private key and the corresponding platform public key. For example, the trusted execution environment platform may sign the to-be-verified data or the environment signature with the platform private key to obtain the signature information about the environment signature, and send the to-be-verified data and the signature information to the blockchain network. The block node in the blockchain network may verify the signature information with the platform public key corresponding to the platform private key. If the verification succeeds, it is determined that the environment signature is normal, and the to-be-verified data or the environment signature may be obtained. In some embodiments, the signature information can alternatively be verified based on the environment public key of the trusted execution environment platform. For example, the trusted execution environment platform generates the environment public key according to the environment private key and a third public parameter. The block node obtains the environment public key of the trusted execution environment platform to obtain the signature information about the environment signature and the third public parameter; determine a to-be-verified signature by using the environment public key, the signature information, and the third public parameter; and determine that the environment signature is normal if the to-be-verified signature matches the environment signature. For example, the trusted execution environment platform may obtain the third public parameter, where the third public parameter may include a prime parameter q and an original root parameter, and the original root parameter may be an original root of the prime parameter q; randomly select an environment private key based on the prime parameter, for example, randomly select a number from $[1, q-1]$ as the environment private key; and generate the environment public key of the trusted execution environment platform according to the environment private key and the third public parameter. The trusted execution environment platform may hash the to-be-verified data or the environment signature to obtain a signature hash, where the signature hash may be a value that satisfies a hash range indicated by the prime parameter q (such as $[0, q-1]$); determine a random value according to the third public parameter; generate a first signature according to the random value and the third public parameter; and generate a second signature from the environment private key, the signature hash, the first signature, and the third public parameter. An exemplary generation method for the second signature may be seen in formula (5):

$$S2=(m-x\cdot S1)k^{-1}\bmod(q-1) \qquad (5)$$

As shown in formula (5), S2 is used for representing the second signature, S1 is used for representing the first signature, m is the signature hash, x is the environment private key, and k is the random value.

In some embodiments, the first signature and the second signature may constitute the signature information about the environment signature, and the to-be-verified data (or the environment signature) and the signature information may be sent to the blockchain network. The block node in the blockchain network may hash the to-be-verified data or the environment signature to obtain a signature hash, and generate signature conversion data according to the third public parameter and the signature hash; determine a to-be-verified signature according to the environment public key, the signature information, and the third public parameter; and determine that the to-be-verified signature matches the environment signature if the to-be-verified signature is the same as the signature conversion data.

Step S302. Trigger an environment verification event including the environment signature based on the verification request.

Here, after the verification request is initiated, the oracle smart contract may trigger the environment verification event upon obtaining the verification request. For example, the oracle smart contract parses the verification request to obtain the environment signature included in the verification request, and generates the environment verification event including the environment signature of the trusted execution environment platform. The environment verification event may be used for the verification service node to verify the credibility of the trusted execution environment platform based on the environment signature. Alternatively, the oracle smart contract may generate the environment verification event including the verification request upon obtaining the verification request, so that the verification service node verifies the credibility of the trusted execution environment platform based on the verification request.

In practical applications, the oracle smart contract may send the environment verification event to the oracle node, or the oracle node periodically detects an environment verification event. Upon obtaining the environment verification event, the oracle node parses the environment verification event to obtain to-be-verified data including the environment signature (the to-be-verified data may be obtained by encrypting the environment signature) and object information used for verifying the credibility of the trusted execution environment platform, where the object information may be an identifier of a device used for verifying the credibility of the trusted execution environment platform (such as a node identifier of the verification service node). Then, the oracle node sends the to-be-verified data including the environment signature to the verification service node based on the object information, and the verification service node verifies the credibility of the trusted execution environment platform based on the environment signature included in the to-be-verified data to obtain verification information.

In practical applications, the environment verification event is used for the oracle node to obtain the verification information of the to-be-verified data from the verification service node when detecting out the environment verification event, and the verification information of the to-be-verified data is included in the environment verification event.

In an embodiment of this application, the block node determines an event name and a processing object for the verification request based on the verification request in a process of running the oracle smart contract. The processing object is used for indicating the verification service node that responds to the verification request, that is, the processing object is used for indicating a device that can process the verification request, namely, the verification service node that responds to the verification request. The environment verification event is triggered according to the event name, the environment signature corresponding to the trusted execution environment platform, and the processing object, so that the oracle node determines the verification service node based on the environment verification event, and obtains the verification information about the to-be-verified data included in the environment verification event from the verification service node. For example, the block node may trigger the environment verification event including the environment signature through the oracle smart contract. In practical applications, the environment verification event may include to-be-verified data, and the to-be-verified data includes the environment signature. The oracle node may detect the oracle smart contract in the blockchain network. When an event is generated in the oracle smart contract, the event generated in the oracle smart contract may be obtained. For example, the oracle node detects out the environment verification event generated in the oracle smart contract in the blockchain network, and parses the environment verification event to obtain the to-be-verified data and the processing object, where the processing object is used for indicating a device that can respond to the verification request, namely, the verification service node. The oracle node may send the to-be-verified data to the verification service node based on the processing object. The verification service node verifies the to-be-verified data to obtain a verification result of the to-be-verified data, and generates a verification signature for the verification result. The verification service node may generate verification information based on the verification result and the verification signature, and send the verification information to the oracle node.

Step S303. Obtain the verification information from the oracle node and feed back the verification information to the verification smart contract.

Here, during running of the oracle smart contract, the block node may know that the verification information including the environment signature has been stored in the oracle node after triggering the environment verification event including the environment signature, and may continue to obtain the verification information from the oracle node based on the oracle smart contract.

In an embodiment of this application, the oracle node may call the oracle smart contract and send the verification information to the oracle smart contract; and the block node may obtain the verification information based on the oracle smart contract, call the verification smart contract, and feed back the verification information to the verification smart contract. The verification smart contract may be called or detected by the service device, the trusted execution environment platform, and the like to obtain the verification information about the to-be-verified data from the blockchain network.

In some embodiments, the verification information includes the verification result about the to-be-verified data and the verification signature of the verification service node about the verification result, where the verification result includes a verification result about the environment signature, which is used for indicating the credibility of the trusted execution environment platform, and the verification signature is obtained by signing the verification result. The block node may obtain a verification public key of the verification service node based on the verification smart contract, and verify the verification signature with the verification public key. If the verification signature passes the verification, an object verification block is generated according to the verification result and the verification signature, and the object verification block is added to the blockchain. If the verification signature fails in the verification, the oracle smart contract is called, and the environment verification event is re-triggered through the oracle smart contract, so that the oracle node obtains, based on the re-triggered environment verification event, new verification information about the re-triggered environment verification event, that is, steps S301 to S303 above are repeated. Alternatively, if the verification signature fails in the verification, the oracle smart contract is called based on the verification smart contract, and a signature anomaly event is generated based on the oracle smart contract, where the signature anomaly event can indicate that the verification signature fails in the verification or the verification signature is abnormal. The oracle node may obtain the verification information when detecting out the signature anomaly event, and send a signature anomaly message to the verification service node based on the verification information, where the signature anomaly message is used for indicating that the verification signature fails in the verification or the verification signature is abnormal. The verification service node may check the verification information based on the signature anomaly message and update the result indicated by the verification information to obtain updated verification information, where the updated verification information is used for indicating a verification result for the verification signature after the verification information is checked. For example, by checking the verification information, it is determined that the verification signature fails in the verification, the updated verification information still indicates that the signature verification fails in the verification, and the updated verification information is sent to the oracle node, so that the oracle node returns the updated verification information to the blockchain network. In practical applications, the verification service node may encrypt the updated verification information and send the encrypted updated verification information to the oracle node, the oracle node returns the encrypted updated verification information to the blockchain network, and the block node may decrypt the encrypted updated verification information to obtain the updated verification information, so as to improve the security of data transmission.

In some embodiments, the block node may trigger a verification chaining event based on the verification smart contract, the trusted execution environment platform may obtain the verification information based on the verification chaining event, and the service device may obtain the verification information based on the verification chaining event. Alternatively, the trusted execution environment platform or the service device may obtain an object verification block from the blockchain and obtain the verification result from the object verification block when needed. For example, the block node may trigger the verification chaining event based on the verification smart contract, so that the service device obtains the object verification block from the blockchain upon detecting out the verification chaining event, and the trusted execution environment platform sends service data to a target device when the verification result in the object verification block is a verification pass result; or the verification chaining event is triggered based on the verification smart contract, so that the trusted execution environment platform obtains the object verification block from the blockchain upon detecting out the verification chaining event, and outputs a verification result when the verification result in the object verification block is a verification pass result.

In some embodiments, refer to FIG. 4. FIG. 4 is a flowchart of another blockchain-based data detection method according to an embodiment of this application. As shown in FIG. 4, an oracle node serves as an executive subject, the oracle node may be a computer device, and the blockchain-based data detection method includes the following steps:

Step S401. Obtain verification information about to-be-verified data from a verification service node upon detecting out an environment verification event triggered by an oracle smart contract.

Here, the verification information of the to-be-verified data is included in the environment verification event.

In an embodiment of this application, the oracle node may detect an event generated by the oracle smart contract, parse the detected event to determine an event processing process of the event, and obtain an event processing result based on the event processing process. The event here may refer to the environment verification event. The oracle node detects out the environment verification event generated by the oracle smart contract, and parses the environment verification event to determine the event processing process of the event, where the event processing process is used for representing verification of the to-be-verified data by the verification service node. In some embodiments, the oracle node sends the to-be-verified data to the verification service node, so that the verification service node verifies the to-be-verified data to obtain a verification result of the to-be-verified data and generates a verification signature of the verification result. The oracle node obtains the verification information from the verification service node, where the verification information includes the verification result and the verification signature, as described in step S302 in FIG. 3.

Step S402. Send the verification information to the oracle smart contract, so that the oracle smart contract returns the verification information to a verification smart contract.

In an embodiment of this application, the oracle node sends the verification information to the oracle smart contract, so that the oracle smart contract returns the verification information to the verification smart contract, where the verification smart contract can chain the verification information.

Figure 5:
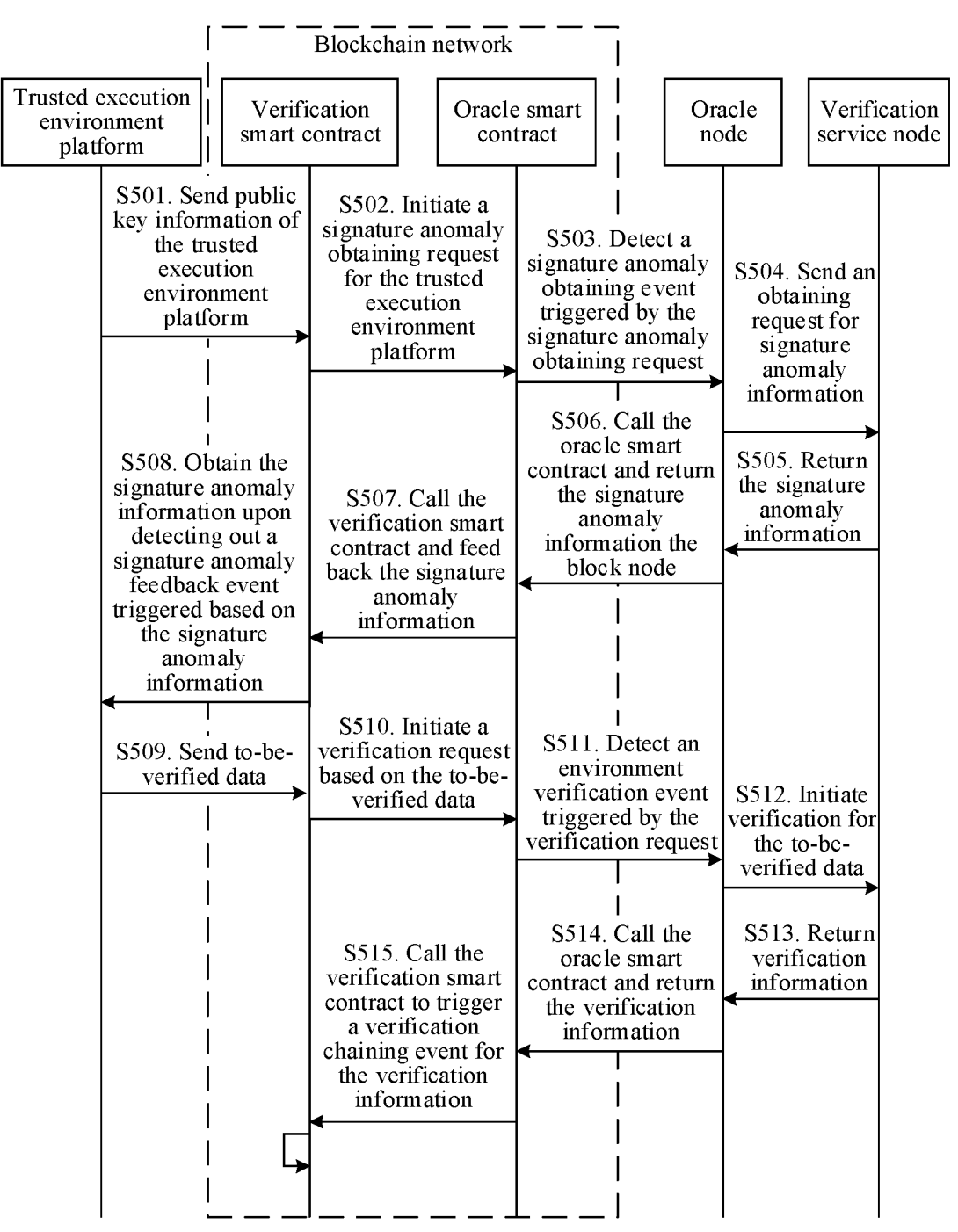
FIG. 5 is a schematic diagram of blockchain-based data detection interaction according to an embodiment of this application.

Refer to FIG. 5. FIG. 5 is a schematic diagram of blockchain-based data detection interaction according to an embodiment of this application. As shown in FIG. 5, the process may include the following steps:

Step S501. A trusted execution environment platform sends public key information of the trusted execution environment platform to a block node.

In an embodiment of this application, the trusted execution environment platform may send the public key information of the trusted execution environment platform to a blockchain network. The public key information may include a platform public key of a trusted environment object in the trusted execution environment platform. In practical applications, the public key information may further include first communication parameters, and encrypted data may be transmitted to the blockchain network by using the first communication parameters. For example, the first communication parameters may include a symmetric encryption key, and encrypted transmission of data is implemented through the symmetric encryption key. For example, the platform public key may be encrypted with the symmetric encryption key to obtain a public key ciphertext, and the public key ciphertext and the symmetric encryption key are sent to the blockchain network. Alternatively, the first communication parameters may include a first public parameter, a second public parameter, and an environment public key, and encrypted transmission of data is implemented through the first public parameter, the second public parameter, and the environment public key. For example, the platform public key may be encrypted with the first public parameter, the second public parameter, and the environment public key to obtain a public key ciphertext, and the public key ciphertext, the first public parameter, the second public parameter, and the environment public key are sent to the blockchain network.

Here, the first public parameter may be a prime number, and the second public parameter may be a primitive root.

Step S502. The block node initiates a signature anomaly obtaining request for the trusted execution environment platform.

In an embodiment of this application, the block node obtains, based on a verification smart contract, the public key information sent by the trusted execution environment platform, and may call an oracle smart contract based on the verification smart contract to initiate the signature anomaly obtaining request for the trusted execution environment platform. The signature anomaly obtaining request may include the public key information sent by the trusted execution environment platform, and the signature anomaly obtaining request may be used for requesting to obtain an environment signature associated with a platform private key of a trusted environment object suffering from a leakage risk. In the oracle smart contract, a signature anomaly obtaining event is triggered based on the signature anomaly obtaining request, so that the oracle node performs step S503.

Step S503. The oracle node detects a signature anomaly obtaining event triggered by the signature anomaly obtaining request.

In an embodiment of this application, upon detecting out the signature anomaly obtaining event, the oracle node obtains signature anomaly information associated with the trusted execution environment platform from a verification service node, as shown in steps S504 and S505.

Step S504. The oracle node sends an obtaining request for signature anomaly information to a verification service node.

In an embodiment of this application, upon detecting out the signature anomaly obtaining event, the oracle node may parse the signature anomaly obtaining event to obtain anomaly event association parameters, and send the obtaining request for the signature anomaly information to the verification service node, where the anomaly event association parameters may include public key information and the like, and the obtaining request may include the anomaly event association parameters.

Step S505. The verification service node returns the signature anomaly information to the oracle node.

In an embodiment of this application, upon receiving the obtaining request for signature anomaly information from the oracle node, the verification service node parses the obtaining request to obtain the anomaly event association parameters included in the obtaining request, obtains the signature anomaly information based on the anomaly event association parameters, and returns the signature anomaly information to the oracle node. In practical applications, the verification service node may obtain the platform public key in the abnormal event association parameters and obtain the signature anomaly information associated with the platform public key. The signature anomaly information may be considered as including signature revocation list (SigRL) information, and the SigRL list may be considered as a signature list associated with the platform private key of the trusted environment object suffering from the leakage risk.

Step S506. The oracle node calls the oracle smart contract and returns the signature anomaly information to the block node.

In an embodiment of this application, the oracle node may call the oracle smart contract and feed back the signature anomaly information to the oracle smart contract. For example, the block node may obtain the signature anomaly information from the oracle node based on the oracle smart contract, and perform step S507.

Step S507. The block node calls the verification smart contract and returns the signature anomaly information.

In an embodiment of this application, the block node may call the verification smart contract and feed back the signature anomaly information to the verification smart contract. In practical applications, the block node may run the verification smart contract to trigger a signature anomaly feedback event based on the signature anomaly information, so that the trusted execution environment platform performs step S508, namely, obtains the signature anomaly information upon detecting out the signature anomaly feedback event, and transmits the environment signature to the verification smart contract based on the signature anomaly information. In practical applications, the block node may obtain second communication parameters in the verification smart contract, encrypt the signature anomaly information with the second communication parameters to obtain an abnormal signature ciphertext, and trigger the signature anomaly feedback event based on the abnormal signature ciphertext and the second communication parameters, where the second communication parameters may be referenced to the first communication parameters, and a symmetric encryption key in the second communication parameters may be the same as or different from the symmetric encryption key in the first communication parameters. Alternatively, a first public parameter, a second public parameter, and an environment public key in the second communication parameters may be the same as or different from the first public parameter, the second public parameter, and the environment public key in the first communication parameters.

Step S508. The trusted execution environment platform obtains the signature anomaly information upon detecting out a signature anomaly feedback event triggered based on the signature anomaly information.

In an embodiment of this application, the trusted execution environment platform obtains the signature anomaly information upon detecting out the signature anomaly feedback event, and may transmit the environment signature to the verification smart contract based on the signature anomaly information. In practical applications, the trusted execution environment platform may obtain the abnormal signature ciphertext and the second communication parameters, and decrypt the abnormal signature ciphertext based on the second communication parameters to obtain the signature anomaly information. In practical applications, if the signature anomaly information is used for indicating that the trusted execution environment platform is a normal platform, steps S509 to S516 can be performed based on the signature anomaly information, and the oracle smart contract can be called based on the verification smart contract to initiate a verification request for the trusted execution environment platform. An abnormal trusted environment object corresponding to the signature anomaly information and a to-be-detected environment object corresponding to the environment signature may be obtained. If the to-be-detected environment object is not the abnormal trusted environment object, the signature anomaly information is determined to indicate that the trusted execution environment platform is a normal platform. Alternatively, the signature anomaly information may be detected based on a signature detection condition provided by the verification service node, and a detection result of the trusted execution environment platform may be determined based on the detection results, where the detection result is used for indicating whether the trusted execution environment platform is a normal platform or an abnormal platform.

Step S509. The trusted execution environment platform sends to-be-verified data to the block node.

In an embodiment of this application, the trusted execution environment platform may send the to-be-verified data to the blockchain network, where the to-be-verified data may include the environment signature and the like, as described in step S301 in FIG. 3.

Step S510. The block node initiates a verification request based on the to-be-verified data.

In an embodiment of this application, the block node may call the oracle smart contract based on the verification smart contract to initiate the verification request for the trusted execution environment platform, where the verification request is used for requesting to verify credibility of the trusted execution environment platform, as described in step S301 in FIG. 3.

Step S511. The oracle node detects an environment verification event triggered by the verification request.

In an embodiment of this application, the block node may trigger, in the oracle smart contract, the environment verification event including the environment signature based on the verification request. The oracle node performs step S512 upon detecting out the environment verification event, as described in step S301 in FIG. 3.

Step S512. The oracle node initiates verification for the to-be-verified data.

In an embodiment of this application, the oracle node may initiate the verification request for the to-be-verified data to the verification service node based on the environment verification event.

Step S513. The verification service node returns verification information to the oracle node.

In an embodiment of this application, the verification service node may verify the to-be-verified data in the environment verification event to obtain a verification result about the to-be-verified data, sign the verification result to obtain a verification signature, combine the verification result about the to-be-verified data with the verification signature of the verification service node about the verification result to form the verification information, and return the verification information to the oracle node.

Step S514. The oracle node calls the oracle smart contract and returns the verification information to the block node.

In an embodiment of this application, the oracle node may call the oracle smart contract and return the verification information to the oracle smart contract, as described in step S302 in FIG. 3.

Step S515. The block node calls the verification smart contract to trigger a verification chaining event for the verification information.

In an embodiment of this application, the block node may call the verification smart contract through the oracle smart contract and feed back the verification information to the verification smart contract, as described in step S303 in FIG. 3.

In an embodiment of this application, the block node may verify the verification signature, generate an object verification block according to the verification result and the verification signature if the verification signature passes the verification, and add the object verification block to the blockchain. In practical applications, the block node may alternatively trigger a block processing event through the verification smart contract, and generate an object verification block based on the block processing event. In some embodiments, the verification chaining event may be triggered.

In practical applications, a service device may obtain the verification result about the to-be-verified data from the blockchain upon detecting out the verification chaining event. The trusted execution environment platform may obtain the verification result about the to-be-verified data from the blockchain upon detecting out the verification chaining event. In practical applications, the service device or the trusted execution environment platform may alternatively directly obtain the verification result about the to-be-verified data from the blockchain when needed. In practical applications, the trusted execution environment platform may output the verification result.

In some embodiments, when the service device needs to use the trusted execution environment platform, the service device may obtain the verification result about the trusted execution environment platform from the trusted execution environment platform, and may access the trusted execution environment platform if the verification result is a verification pass result. In practical applications, when the service device needs to use the trusted execution environment platform, the service device may obtain the verification result about the trusted execution environment platform from the blockchain, and may access the trusted execution environment platform if the verification result is a verification pass result. In practical applications, the service device may obtain validity of the verification result, and may access the trusted execution environment platform when the verification result is a verification pass result if the verification result is valid. If the verification result is invalid, the foregoing steps shown in FIG. 3 are performed to obtain the verification result of the trusted execution environment platform. In practical applications, if the verification result about the trusted execution environment platform is not obtained, the foregoing steps shown in FIG. 3 may be performed to obtain the verification result of the trusted execution environment platform.

For example, the service device includes a first service device and a second service device, and the first service device and the second service device may obtain the verification result of the trusted execution environment platform. When the verification result is a verification pass result, the first service device may send service data to the trusted execution environment platform, the second service device may send a data parsing model to the trusted execution environment platform, and the trusted execution environment platform may convert the service data by using the data parsing model to obtain service conversion data and send the service conversion data to the second service device.

In the embodiments of this application, a block node may call an oracle smart contract based on a verification smart contract to initiate a verification request for a trusted execution environment platform, where the verification request includes an environment signature corresponding to the trusted execution environment platform; trigger, in the oracle smart contract, an environment verification event including the environment signature based on the verification request, so that the oracle node obtains, upon detecting out the environment verification event, verification information about to-be-verified data included in the environment verification event from a verification service node, where the to-be-verified data includes the environment signature; and obtain the verification information from the oracle node based on the oracle smart contract and feed back the verification information to the verification smart contract. The trusted execution environment platform is verified through the above process to ensure the security, reliability, and credibility of the trusted execution environment platform, so that data security can be ensured when the trusted execution environment platform is used subsequently. Moreover, the trusted execution environment platform is remotely verified through the smart contracts based on the characteristics of openness, transparency, and tamper resistance of the blockchain, so that the verification process is traceable, the credibility of verification on the trusted execution environment platform is improved, and the accuracy of verification on the trusted execution environment platform is improved accordingly. Meanwhile, communication between the blockchain network and the verification service node is directly opened through the oracle smart contract and the oracle node to implement real-time verification, thereby improving verification efficiency and reducing operation and maintenance costs.

Figure 6:
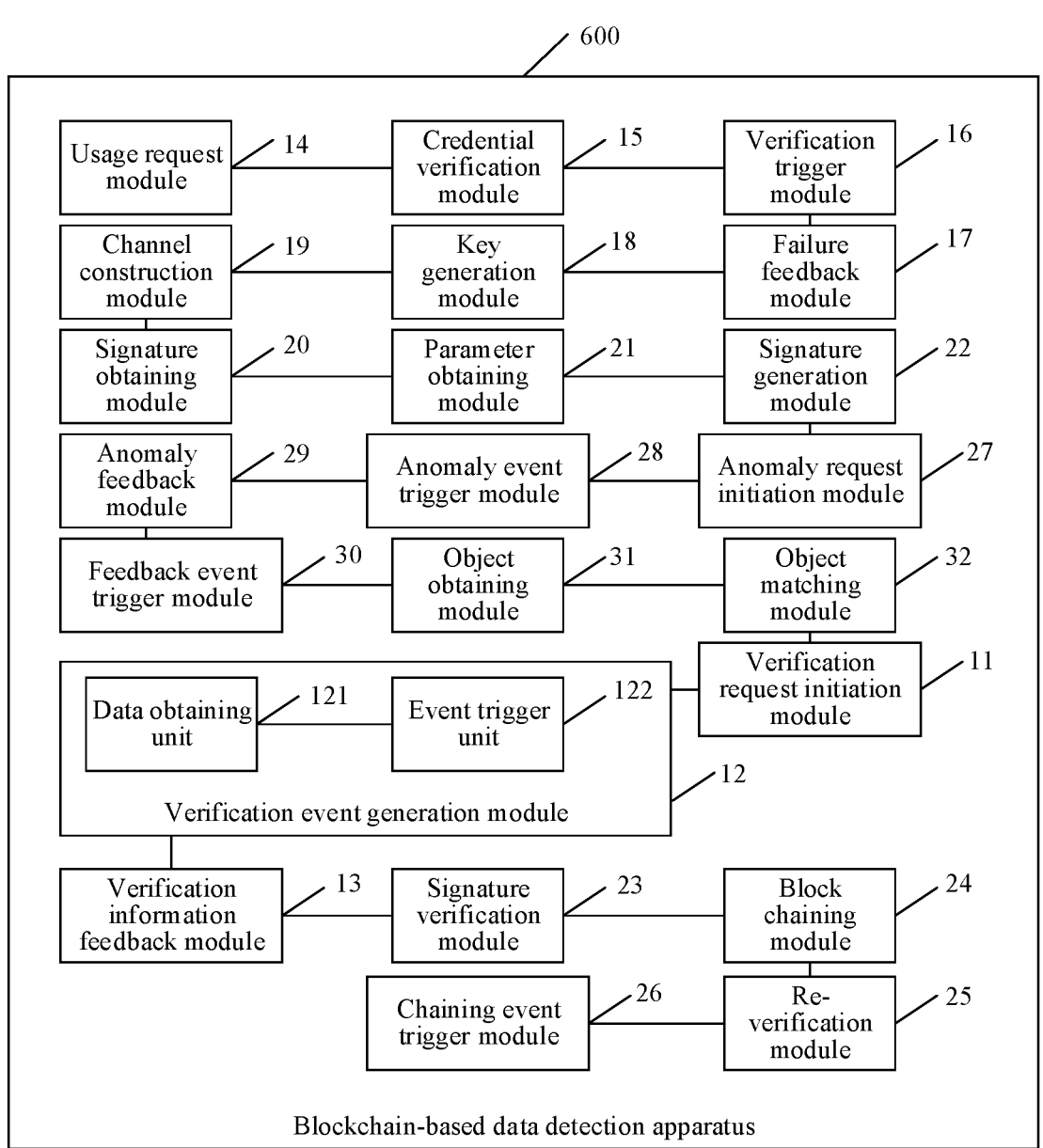
FIG. 6 is a schematic diagram of a blockchain-based data detection apparatus according to an embodiment of this application.

In some embodiments, refer to FIG. 6. FIG. 6 is a schematic diagram of a blockchain-based data detection apparatus according to an embodiment of this application. The blockchain-based data detection apparatus may be a computer program (including program code and the like) running in a computer device, for example, the blockchain-based data detection apparatus may be an application software program; and the apparatus may be configured to perform the corresponding steps in the method provided in the embodiments of the present application. As shown in FIG. 6, the blockchain-based data detection apparatus 600 may be used for a computer device in the embodiment corresponding to FIG. 3, for example, the apparatus may include: a verification request initiation module 11, a verification event generation module 12, and a verification information feedback module 13.

The verification request initiation module 11 is configured to call an oracle smart contract based on a verification smart contract to initiate a verification request for a trusted execution environment platform, where the verification request includes an environment signature corresponding to the trusted execution environment platform.

The verification event generation module 12 is configured to trigger an environment verification event including the environment signature based on the verification request, where the environment verification event is used for triggering an oracle node to obtain verification information about to-be-verified data from a verification service node, the to-be-verified data is included in the environment verification event, and the to-be-verified data includes the environment signature.

The verification information feedback module 13 is configured to obtain the verification information from the oracle node and feed back the verification information to the verification smart contract.

The apparatus 600 further includes:
a usage request module 14, configured to receive a usage request sent by a service device for the trusted execution environment platform, where the usage request includes an object credential of a trusted environment object in the trusted execution environment platform;
a credential verification module 15, configured to verify the object credential;

a verification trigger module 16, configured to perform the process of calling an oracle smart contract based on a verification smart contract to initiate a verification request for a trusted execution environment platform if the object credential passes the verification; and a failure feedback module 17, configured to send a usage failure message to the service device if the object credential fails in the verification.

The apparatus 600 further includes:

a key generation module 18, configured to obtain a first public parameter and a second public parameter, obtain a block private parameter, and generate a block public key according to the first public parameter, the second public parameter, and the block private parameter;

a channel construction module 19, configured to obtain an environment public key corresponding to the trusted execution environment platform, and construct a communication channel to the trusted execution environment platform based on the block public key and the environment public key, where the environment public key is generated by the trusted execution environment platform according to the first public parameter, the second public parameter, and an environment private parameter; and a signature obtaining module 20, configured to obtain the environment signature corresponding to the trusted execution environment platform through the communication channel.

The apparatus 600 further includes:

a parameter obtaining module 21, configured to obtain the environment public key of the trusted execution environment platform, signature information about the environment signature, and a third public parameter, where the environment public key is generated according to an environment private key of the trusted execution environment platform and the third public parameter; and a signature generation module 22, configured to determine a to-be-verified signature by using the environment public key, the signature information, and the third public parameter; and determine that the environment signature is normal if the to-be-verified signature matches the environment signature.

The verification event generation module 12 includes:

a data obtaining unit 121, configured to determine, in the oracle smart contract, an event name and a processing object for the verification request based on the verification request, where the processing object is used for indicating the verification service node that responds to the verification request; and an event trigger unit 122, configured to trigger the environment verification event according to the event name, the environment signature corresponding to the trusted execution environment platform, and the processing object, so that the oracle node determines the verification service node based on the environment verification event, and obtains the verification information about the to-be-verified data included in the environment verification event from the verification service node.

The verification information includes a verification result about the to-be-verified data and a verification signature of the verification service node about the verification result.

The apparatus 600 further includes:

a signature verification module 23, configured to obtain a verification public key of the verification service node based on the verification smart contract, and verify the verification signature with the verification public key;

a block chaining module 24, configured to generate an object verification block according to the verification result and the verification signature if the verification signature passes verification, and add the object verification block to a blockchain; and a re-verification module 25, configured to call the oracle smart contract if the verification signature fails in the verification, and re-trigger the environment verification event through the oracle smart contract, so that the oracle node obtains, based on the re-triggered environment verification event, new verification information about the re-triggered environment verification event.

The apparatus 600 further includes:

a chaining event trigger module 26, configured to trigger the verification chaining event based on the verification smart contract, so that the service device obtains the object verification block from the blockchain upon detecting out the verification chaining event, and the trusted execution environment platform sends service data to a target device when the verification result in the object verification block is a verification pass result; or the chaining event trigger module 26, further configured to trigger the verification chaining event based on the verification smart contract, so that the trusted execution environment platform obtains the object verification block from the blockchain upon detecting out the verification chaining event, and outputs a verification result when the verification result in the object verification block is a verification pass result.

The apparatus 600 further includes:

an anomaly request initiation module 27, configured to call the oracle smart contract based on the verification smart contract to initiate a signature anomaly obtaining request for the trusted execution environment platform;

an anomaly event trigger module 28, configured to trigger a signature anomaly obtaining event based on the signature anomaly obtaining request, so that the oracle node obtains, upon detecting out the signature anomaly obtaining event, signature anomaly information associated with the trusted execution environment platform from the verification service node; and the verification trigger module 16, further configured to perform, based on the signature anomaly information, the process of calling an oracle smart contract based on a verification smart contract to initiate a verification request for a trusted execution environment platform, if the signature anomaly information is used for indicating that the trusted execution environment platform is a normal platform.

The apparatus 600 further includes:

an anomaly feedback module 29, configured to obtain the signature anomaly information from the oracle node based on the oracle smart contract, call the verification smart contract, and feed back the signature anomaly information to the verification smart contract; and a feedback event trigger module 30, configured to trigger a signature anomaly feedback event based on the signature anomaly information, so that the trusted execution environment platform obtains the signature anomaly information upon detecting out the signature anomaly feedback event, and transmits the environment signature to the verification smart contract based on the signature anomaly information.

The apparatus 600 further includes:

an object obtaining module 31, configured to obtain an abnormal trusted environment object corresponding to the signature anomaly information, and obtain a to-be-detected environment object corresponding to the environment signature; and an object matching module 32, configured to determine the signature anomaly information to indicate that the trusted execution environment platform is a normal platform if the to-be-detected environment object is not the abnormal trusted environment object.

This embodiment of this application provides a block-chain-based data detection apparatus. The apparatus may run in a block node and call an oracle smart contract based on a verification smart contract to initiate a verification request for a trusted execution environment platform, where the verification request includes an environment signature corresponding to the trusted execution environment platform; trigger, in the oracle smart contract, an environment verification event including the environment signature based on the verification request, so that the oracle node obtains, upon detecting out the environment verification event, verification information about to-be-verified data included in the environment verification event from a verification service node, where the to-be-verified data includes the environment signature; and obtain the verification information from the oracle node based on the oracle smart contract and feed back the verification information to the verification smart contract. The trusted execution environment platform is verified through the above process to ensure the security, reliability, and credibility of the trusted execution environment platform, so that data security can be ensured when the trusted execution environment platform is used subsequently. Moreover, the trusted execution environment platform is remotely verified through the smart contracts based on the characteristics of openness, transparency, and tamper resistance of the blockchain, so that the verification process is traceable, the credibility of verification on the trusted execution environment platform is improved, and the accuracy of verification on the trusted execution environment platform is improved accordingly. Meanwhile, communication between the blockchain network and the verification service node is directly opened through the oracle smart contract and the oracle node to implement real-time verification, thereby improving verification efficiency and reducing operation and maintenance costs.

Figure 7:
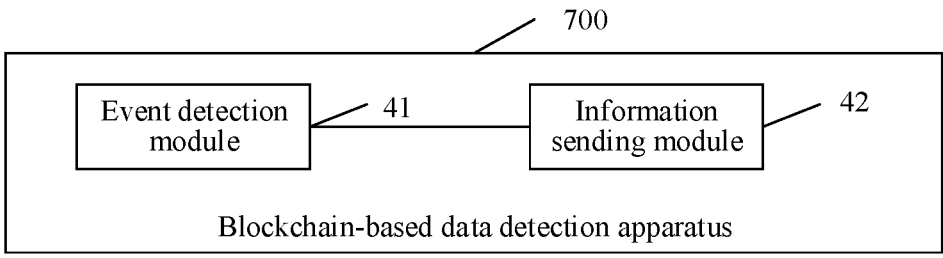
FIG. 7 is a schematic diagram of another blockchain-based data detection apparatus according to an embodiment of this application.

In some embodiments, refer to FIG. 7. FIG. 7 is a schematic diagram of another blockchain-based data detection apparatus according to an embodiment of this application. The blockchain-based data detection apparatus may be a computer program (including program code and the like) running in a block node, for example, the blockchain-based data detection apparatus may be an application software program; and the apparatus may be configured to perform the corresponding steps in the method provided in the embodiments of the present application. As shown in FIG. 7, the blockchain-based data detection apparatus 700 may be used for a computer device in the embodiment corresponding to FIG. 4, for example, the apparatus may include: an event detection module 41 and an information sending module 42.

The event detection module 41 is configured to obtain verification information about to-be-verified data included in an environment verification event from a verification service node upon detecting out the environment verification event triggered by an oracle smart contract, where the to-be-verified data includes an environment signature corresponding to the trusted execution environment platform, the environment signature is included in a verification request for the trusted execution environment platform, and the oracle smart contract is called by a verification smart contract.

The information sending module 42 is configured to send the verification information to the oracle smart contract, so that the oracle smart contract returns the verification information to the verification smart contract.

This embodiment of this application provides a blockchain-based data detection apparatus, which may run in an oracle node, where communication between a blockchain network and a verification service node is directly opened through an oracle smart contract and an oracle node to implement real-time verification, thereby improving the efficiency of verification on a trusted execution environment platform and then reducing operation and maintenance costs.

Figure 8:
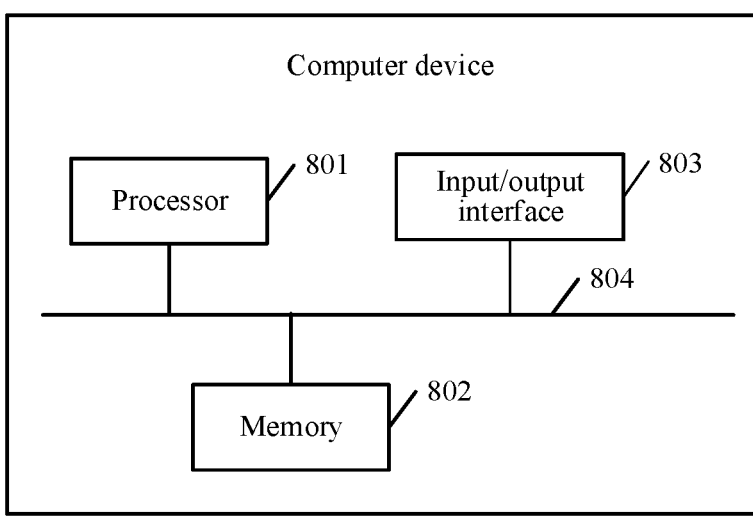
FIG. 8 is a schematic structural diagram of a computer device according to an embodiment of this application.

Refer to FIG. 8. FIG. 8 is a schematic structural diagram of a computer device according to an embodiment of this application. As shown in FIG. 8, the computer device in this embodiment of this application may include: one or more processors 801, a memory 802, and an input/output interface 803. The processor 801, the memory 802, and the input/output interface 803 are connected by a bus 804. The memory 802 is configured to store a computer program, the computer program including program instructions. The input/output interface 803 is configured to receive and output data, for example, configured to perform data interaction between a block node and a trusted execution environment platform, between a block node and a service device, or between a block node and an oracle node. The processor 801 is configured to execute the program instructions stored in the memory 802.

The processor 801 is deployed in the block node, and may perform the following operations:

calling an oracle smart contract based on a verification smart contract to initiate a verification request for a trusted execution environment platform, where the verification request includes an environment signature corresponding to the trusted execution environment platform;

triggering, in the oracle smart contract, an environment verification event including the environment signature based on the verification request, so that the oracle node obtains, upon detecting out the environment verification event, verification information about to-be-verified data included in the environment verification event from a verification service node, where the to-be-verified data includes the environment signature; and obtaining the verification information from the oracle node based on the oracle smart contract and returning the verification information to the verification smart contract.

The processor 801 is deployed in an oracle node, and may perform the following operations:

obtaining verification information about to-be-verified data included in an environment verification event from a verification service node upon detecting out the environment verification event triggered by an oracle smart contract, where the to-be-verified data includes an environment signature corresponding to a trusted execution environment platform, the environment signature is provided by the verification request initiated by the oracle smart contract for the trusted execution environment platform, and the oracle smart contract is called by a verification smart contract; and sending the verification information to the oracle smart contract, so that the oracle smart contract returns the verification information to the verification smart contract.

In some feasible implementations, the processor 801 may be a central processing unit (CPU), and the processor may alternatively be other general-purpose processor, digital signal processor (DSP), application specific integrated circuit (ASIC), field-programmable gate array (FPGA), or other programmable logic device, discrete gate or transistor logic device, discrete hardware component, or the like. The general-purpose processor may be a microprocessor, or the processor may be any conventional processor or the like.

The memory 802 may include a read-only memory and a random access memory, and provides instructions and data to the processor 801 and the input/output interface 803. A part of the memory 802 may further include a non-volatile random access memory. For example, the memory 802 may store information of a device type.

In specific implementations, the computer device may perform the implementations provided by the steps in FIG. 3 or FIG. 4 through built-in functional modules. For details, refer to the implementations provided by the steps in FIG. 3 or FIG. 4, which will not be repeated here.

An embodiment of this application provides a computer device, including: a processor, an input/output interface, and a memory, where the processor obtains a computer program from the memory, and executes the steps of the method shown in FIG. 3 or FIG. 4 to perform blockchain-based data detection operations. This embodiment of this application implements calling an oracle smart contract based on a verification smart contract to initiate a verification request for a trusted execution environment platform, where the verification request includes an environment signature corresponding to the trusted execution environment platform; triggering, in the oracle smart contract, an environment verification event including the environment signature based on the verification request, so that the oracle node obtains, upon detecting out the environment verification event, verification information about to-be-verified data included in the environment verification event from a verification service node, where the to-be-verified data includes the environment signature; and obtaining the verification information from the oracle node based on the oracle smart contract and returning the verification information to the verification smart contract. The trusted execution environment platform is verified through the above process to ensure the security, reliability, and credibility of the trusted execution environment platform, so that data security can be ensured when the trusted execution environment platform is used subsequently. Moreover, the trusted execution environment platform is remotely verified through the smart contracts based on the characteristics of openness, transparency, and tamper resistance of the blockchain, so that the verification process is traceable, the credibility of verification on the trusted execution environment platform is improved, and the accuracy of verification on the trusted execution environment platform is improved accordingly. Meanwhile, communication between the blockchain network and the verification service node is directly opened through the oracle smart contract and the oracle node to implement real-time verification, thereby improving verification efficiency and reducing operation and maintenance costs.

An embodiment of this application further provides a computer-readable storage medium. The computer-readable storage medium stores a computer program, and the computer program is suitable for being loaded and executed by a processor to perform the blockchain-based data detection method provided in the steps of FIG. 3 or FIG. 4. The specific implementation may be referenced to the steps of FIG. 3 or FIG. 4, and will not be repeated here. In addition, the descriptions of beneficial effects of the same method are not described herein again. For technical details that are not disclosed in the computer-readable storage medium embodiments of this application, refer to the descriptions of the method embodiments of this application. For example, the computer program may be executed on a computer device, or executed on a plurality of computer devices at one site, or executed on a plurality of computer devices distributed at a plurality of sites and interconnected through a communications network.

The computer-readable storage medium may be the blockchain-based data detection apparatus provided by any of the foregoing embodiments or an internal storage unit of the computer device, such as a hard disk or internal memory of the computer device. The computer-readable storage medium may alternatively be an external storage device of the computer device, such as a plug-in hard disk, a smart media card (SMC), a secure digital (SD) card, or a flash card equipped on the computer device. In some embodiments, the computer-readable storage medium may alternatively include both the internal storage unit of the computer device and the external storage device. The computer-readable storage medium is used for storing the computer program and other programs and data required by the computer device. The computer-readable storage medium may alternatively be used for temporarily storing data that have been or will be output.

An embodiment of this application further provides a computer program product or a computer program, the computer program product or the computer program including computer instructions, and the computer instructions being stored in a computer-readable storage medium. A processor of a computer device reads the computer instructions from the computer-readable storage medium, the processor executes the computer instructions, and the computer device is enabled to perform the method provided in various manners in FIG. 3 or FIG. 4 to verify a trusted execution environment platform, thereby ensuring security, reliability, and credibility of the trusted execution environment platform, and ensuring data security when the trusted execution environment platform is used subsequently. Moreover, the trusted execution environment platform is remotely verified through the smart contracts based on the characteristics of openness, transparency, and tamper resistance of the blockchain, so that the verification process is traceable, the credibility of verification on the trusted execution environment platform is improved, and the accuracy of verification on the trusted execution environment platform is improved accordingly. Meanwhile, communication between the blockchain network and the verification service node is directly opened through the oracle smart contract and the oracle node to implement real-time verification, thereby improving verification efficiency and reducing operation and maintenance costs.

The terms "first", "second", and the like in the specification, claims, and the accompanying drawings of the embodiments of this application are used for distinguishing different objects, rather than describing a specific order. In addition, the term "include" and any variant thereof are intended to cover a non-exclusive inclusion. For example, a process, method, apparatus, product, or device that includes a series of steps or units is not limited to the listed steps or modules, but further includes steps or units that are not listed, or further includes other steps or units that are intrinsic to the process, method, apparatus, product, or device.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit. A person of ordinary skill in the art may be aware that the units and algorithm steps of the examples described in the foregoing disclosed embodiments can be implemented by electronic hardware, computer software, or a combination thereof. To clearly describe the interchangeability between the hardware and the software, the foregoing has generally described compositions and steps of each example based on functions. Whether the functions are executed in a mode of hardware or software depends on particular applications and design constraint conditions of the technical solutions. A person skilled in the art may use different methods to implement the described functions for each particular application, but the implementation is not beyond the scope of this application.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A blockchain-based data detection method performed by a computer device, the method comprising:

receiving, from a trusted execution environment platform, an environment signature of the trusted execution environment platform, the trusted execution environment platform being deployed in a local area network;

calling an oracle smart contract based on a verification smart contract to initiate a verification request for the trusted execution environment platform, the verification request comprising the environment signature of the trusted execution environment platform and the oracle smart contract and the verification smart contract being deployed on a blockchain network within the local area network;

triggering an environment verification event comprising the environment signature based on the verification request, including triggering an oracle node to obtain verification information about the trusted execution environment platform from a verification service node external to the local area network in response to the environment verification event, wherein the oracle node being deployed in a demilitarized zone between the blockchain network and the verification service node external to the local area network;

obtaining the verification information from the oracle node and returning the verification information to the verification smart contract;

calling the oracle smart contract to initiate a signature anomaly obtaining request for the trusted execution environment platform;

triggering a signature anomaly obtaining event based on the signature anomaly obtaining request, wherein the oracle node is configured to obtain signature anomaly information associated with the trusted execution environment platform from the verification service node in response to the signature anomaly obtaining event; and when the signature anomaly information indicates that the trusted execution environment platform is a normal platform, performing the process of calling the oracle smart contract to initiate the verification request for the trusted execution environment platform.

2. The method according to claim 1, wherein before the initiation of a verification request for a trusted execution environment platform, the method further comprises:

receiving a usage request for the trusted execution environment platform from a service device, wherein the usage request comprises: an object credential of a trusted environment object in the trusted execution environment platform;

performing the process of calling an oracle smart contract to initiate a verification request for the trusted execution environment platform after the object credential passes verification; and transmitting a usage failure message to the service device when the object credential fails the verification.

3. The method according to claim 1, wherein before the initiation of a verification request for a trusted execution environment platform, the method further comprises:

constructing a communication channel with the trusted execution environment platform; and obtaining the environment signature corresponding to the trusted execution environment platform through the communication channel.

4. The method according to claim 3, wherein the constructing a communication channel to the trusted execution environment platform comprises:

obtaining a first public parameter, a second public parameter, and a block private parameter, and generating a block public key according to the first public parameter, the second public parameter, and the block private parameter; and obtaining an environment public key corresponding to the trusted execution environment platform, and constructing the communication channel to the trusted execution environment platform based on the block public key and the environment public key, wherein the environment public key is generated by the trusted execution environment platform according to the first public parameter, the second public parameter, and an environment private parameter.

5. The method according to claim 1, wherein the triggering an environment verification event comprising the environment signature based on the verification request comprises:

determining an event name and a processing object indicating the verification service node that responds to the verification request for the verification request; and triggering the environment verification event according to the event name, the environment signature, and the processing object, wherein the oracle node is configured to determine the verification service node and obtain the verification information about the trusted execution environment platform from the verification service node, and the verification information is comprised in the environment verification event.

6. The method according to claim 1, wherein the verification information comprises a verification result about the trusted execution environment platform and a verification signature of the verification service node about the verification result; and the method further comprises:

obtaining a verification public key of the verification service node based on the verification smart contract, and verifying the verification signature with the verification public key; and generating an object verification block according to the verification result and the verification signature when the verification signature passes verification, and adding the object verification block to a blockchain.

7. A computer device, comprising a processor, a memory, and an input/output interface, the processor being connected to the memory and the input/output interface respectively, the input/output interface being configured to receive and output data, the memory being configured to store a computer program that, when executed by the processor, causes the computer device to perform a blockchain-based data detection method including:

receiving, from a trusted execution environment platform, an environment signature of the trusted execution environment platform, the trusted execution environment platform being deployed in a local area network;

calling an oracle smart contract based on a verification smart contract to initiate a verification request for the trusted execution environment platform, the verification request comprising the environment signature of the trusted execution environment platform and the oracle smart contract and the verification smart contract being deployed on a blockchain network within the local area network;

triggering an environment verification event comprising the environment signature based on the verification request, including triggering an oracle node to obtain verification information about the trusted execution environment platform from a verification service node external to the local area network in response to the environment verification event, wherein the oracle node being deployed in a demilitarized zone between the blockchain network and the verification service node external to the local area network;

obtaining the verification information from the oracle node and returning the verification information to the verification smart contract;

calling the oracle smart contract to initiate a signature anomaly obtaining request for the trusted execution environment platform;

triggering a signature anomaly obtaining event based on the signature anomaly obtaining request, wherein the oracle node is configured to obtain signature anomaly information associated with the trusted execution environment platform from the verification service node in response to the signature anomaly obtaining event; and when the signature anomaly information indicates that the trusted execution environment platform is a normal platform, performing the process of calling the oracle smart contract to initiate the verification request for the trusted execution environment platform.

8. The computer device according to claim 7, wherein before the initiation of a verification request for a trusted execution environment platform, the method further comprises:

receiving a usage request for the trusted execution environment platform from a service device, wherein the usage request comprises: an object credential of a trusted environment object in the trusted execution environment platform;

performing the process of calling an oracle smart contract to initiate a verification request for the trusted execution environment platform after the object credential passes verification; and transmitting a usage failure message to the service device when the object credential fails the verification.

9. The computer device according to claim 7, wherein before the initiation of a verification request for a trusted execution environment platform, the method further comprises:

constructing a communication channel with the trusted execution environment platform; and obtaining the environment signature corresponding to the trusted execution environment platform through the communication channel.

10. The computer device according to claim 9, wherein the constructing a communication channel to the trusted execution environment platform comprises:

obtaining a first public parameter, a second public parameter, and a block private parameter, and generating a block public key according to the first public parameter, the second public parameter, and the block private parameter; and obtaining an environment public key corresponding to the trusted execution environment platform, and constructing the communication channel to the trusted execution environment platform based on the block public key and the environment public key, wherein the environment public key is generated by the trusted execution environment platform according to the first public parameter, the second public parameter, and an environment private parameter.

11. The computer device according to claim 7, wherein the triggering an environment verification event comprising the environment signature based on the verification request comprises:

determining an event name and a processing object indicating the verification service node that responds to the verification request for the verification request; and triggering the environment verification event according to the event name, the environment signature, and the processing object, wherein the oracle node is configured to determine the verification service node and obtain the verification information about the trusted execution environment platform from the verification service node, and the verification information is comprised in the environment verification event.

12. The computer device according to claim 7, wherein the verification information comprises a verification result about the trusted execution environment platform and a verification signature of the verification service node about the verification result; and the method further comprises:

obtaining a verification public key of the verification service node based on the verification smart contract, and verifying the verification signature with the verification public key; and generating an object verification block according to the verification result and the verification signature when the verification signature passes verification, and adding the object verification block to a blockchain.

13. A non-transitory computer-readable storage medium, the computer-readable storage medium storing a computer program that, when executed by a processor of a computer device, causes the computer device to perform a blockchain-based data detection method including:

receiving, from a trusted execution environment platform, an environment signature of the trusted execution environment platform, the trusted execution environment platform being deployed in a local area network;

calling an oracle smart contract based on a verification smart contract to initiate a verification request for the trusted execution environment platform, the verification request comprising the environment signature of the trusted execution environment platform and the oracle smart contract and the verification smart contract being deployed on a blockchain network within the local area network;

triggering an environment verification event comprising the environment signature based on the verification request, including triggering an oracle node to obtain verification information about the trusted execution environment platform from a verification service node external to the local area network in response to the environment verification event, wherein the oracle node being deployed in a demilitarized zone between the blockchain network and the verification service node external to the local area network;

obtaining the verification information from the oracle node and returning the verification information to the verification smart contract;

calling the oracle smart contract to initiate a signature anomaly obtaining request for the trusted execution environment platform;

triggering a signature anomaly obtaining event based on the signature anomaly obtaining request, wherein the oracle node is configured to obtain signature anomaly information associated with the trusted execution environment platform from the verification service node in response to the signature anomaly obtaining event; and when the signature anomaly information indicates that the trusted execution environment platform is a normal platform, performing the process of calling the oracle smart contract to initiate the verification request for the trusted execution environment platform.

14. The non-transitory computer-readable storage medium according to claim 13, wherein before the initiation of a verification request for a trusted execution environment platform, the method further comprises:

receiving a usage request for the trusted execution environment platform from a service device, wherein the usage request comprises: an object credential of a trusted environment object in the trusted execution environment platform;

performing the process of calling an oracle smart contract to initiate a verification request for the trusted execution environment platform after the object credential passes verification; and transmitting a usage failure message to the service device when the object credential fails the verification.

15. The non-transitory computer-readable storage medium according to claim 13, wherein before the initiation of a verification request for a trusted execution environment platform, the method further comprises:

constructing a communication channel with the trusted execution environment platform; and obtaining the environment signature corresponding to the trusted execution environment platform through the communication channel.

16. The non-transitory computer-readable storage medium according to claim 13, wherein the triggering an environment verification event comprising the environment signature based on the verification request comprises:

determining an event name and a processing object indicating the verification service node that responds to the verification request for the verification request; and triggering the environment verification event according to the event name, the environment signature, and the processing object, wherein the oracle node is configured to determine the verification service node and obtain the verification information about the trusted execution environment platform from the verification service node, and the verification information is comprised in the environment verification event.

17. The non-transitory computer-readable storage medium according to claim 13, wherein the verification information comprises a verification result about the trusted execution environment platform and a verification signature of the verification service node about the verification result; and the method further comprises:

obtaining a verification public key of the verification service node based on the verification smart contract, and verifying the verification signature with the verification public key; and generating an object verification block according to the verification result and the verification signature when the verification signature passes verification, and adding the object verification block to a blockchain.

* * * * *